Patented May 31, 1949

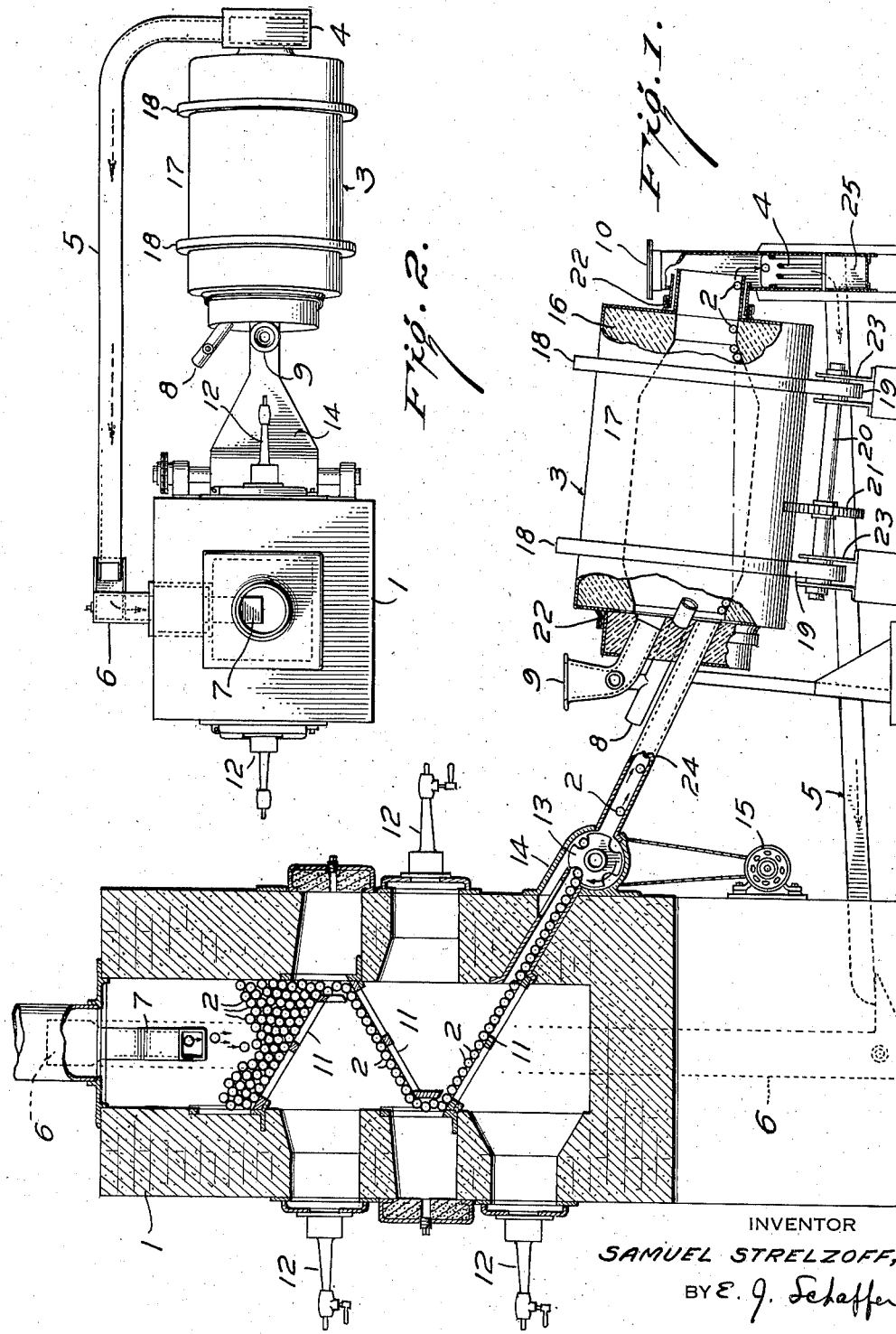

2,471,844

UNITED STATES PATENT OFFICE 2,471,844

METHOD FOR CONVERSION OF IRON CHLORIDE INTO IRON OXIDE AND HYDROCHLORIC ACID

Samuel Strelzoff, New York, N. Y., assignor to Chemical Construction Corporation, New York, N. Y., a corporation of Delaware Application April 12, 1946, Serial No. 661,501

2 Claims. (Cl. 23—155)

This invention relates to a method of producing hydrochloric acid and iron oxide from iron chloride and more particularly to the recovery of hydrochloric acid and iron oxide by heating iron chloride in the presence of water and air or oxygen.

Many industrial processes can be made to yield iron chloride but the problem is to find a use for said iron chloride. I propose to solve the problem by a process whereby iron chloride is converted to hydrochloric acid and iron oxide. The process is one which will yield hydrochloric acid gas of high strength which acid gas can be absorbed in a liquid to form solutions of hydrochloric acid.

Accordingly an object of my invention is to provide a process to produce hydrochloric acid and iron oxide from iron chloride. A further object is to provide a process whereby high strength hydrochloric acid gas and iron oxide may be recovered from iron chloride so that upon absorbing the acid gases in water, a relatively high concentration of hydrochloric acid solution is obtained.

In its broader aspects my invention involves heating and agitating iron chloride in the presence of water and air or oxygen at such temperatures so as to form iron oxide, high strength hydrochloric acid gas, and water and then absorbing the acid gas in a liquid. Essentially the method comprises the steps of heating balls under regulated conditions in a ball furnace, delivering the balls to a rotatory kiln, along with iron chloride either as a concentrated solution or as hydrated iron chloride crystals, and air or oxygen, causing a reaction to take place at temperatures from 600 to 1200° F. which reaction results in formation of iron oxide and the evolution of high strength hydrochloric acid gas and water, withdrawing the gases and absorbing the acid gas in water, passing the balls and the iron oxide over a screen or grate thereby separating them and returning the balls to the furnace and recycling them.

It is a particularly important feature of my invention that the hydrochloric acid gas evolved in the rotatory kiln is of high strength. This desirable condition is obtained in part by separating the products of combustion which supply heat for the reaction from the reaction chamber by the use of a non-gaseous heating medium in the form of solid heat transfer bodies such as balls. The heat necessary for the reaction is thus supplied by the sensible heat in the heated balls. The furnace in which the balls are heated is substantially gas-tight with respect to the reaction chamber or rotatory kiln, and by limiting the amounts of air or oxygen and water vapor entering the kiln to those required by the process the strength of the hydrochloric acid gas is materially increased.

The nature of the reaction in the process is one between a gas and a liquid and a gas and a solid. This is so since the reactants are iron chloride, in the form of either crystals or concentrated solution, air or oxygen and water, in the form of steam or water in the hydrated crystals or in the concentrated solution of the iron chloride. In addition to this the solid reaction product, iron oxide, is discharged in a dry condition so that part of the reaction is between a gas and a solid.

Another important feature of my invention is that the reaction proceeds with rapidity and to completion. This requirement is ordinarily met with great difficulty since the nature of the reaction as described above is between a gas and a liquid or a gas and a solid. The reaction in my process is carried out to completion with rapidity thus allowing the use of relatively small high-capacity apparatus by the use of solid heat transfer bodies such as balls. The agitating and grinding effect obtained by rolling balls in the rotatory kiln speeds up the reaction by bringing the gases necessary for the reaction in contact with the liquid or solids with which they must react. In addition to this films of iron oxide on the iron chloride crystals are prevented from forming and slowing down the reaction by the grinding effect of the balls. It will be apparent, of course, that iron chloride crystals of various hydrations will form in the kiln whether or not the iron chloride is introduced into the kiln either as a concentrated solution or as iron chloride crystals.

Still another feature of my invention is that the gases formed by the reaction be free from pollution in addition to reducing their dilution to a minimum. As explained in part above, the use of solid heat transfer bodies to supply heat for the reaction prevents the dilution and pollution of the evolved gases by the products of combustion. Another source of pollution is vaporized iron chloride which can be formed by a local overheating in the kiln. This difficulty is overcome in my process by the careful regulation of the temperature of the solid heat transfer bodies or balls that are delivered to the kiln. The temperature of the balls can be closely controlled by heating them in a furnace such as described in my copending application, Serial No. 646,301, filed February 8, 1946. When heated in such a furnace the necessary heat for the reaction is supplied by the sensible heat in the balls by varying the rate of delivery of the balls to the kiln, but in no case will the balls be hot enough to vaporize iron chloride in the kiln.

Water is necessary for the reaction. This is supplied by either the water in solution when concentrated solutions are used or by the water of crystallization if hydrated iron chloride crystals are used. Steam also can be used to supply water but when used in my process it is used primarily to regulate the rate of the reaction.

As has been stated, it is an important feature of my process that the acid gas formed is of high strength. Of course if very much water is carried into the reaction chamber or kiln, this will dilute the acid gas, but a dilution by a water vapor is not serious since the water vapor can be removed by condensation. Thus if a concentrated solution of iron chloride is used the percentage of water will be higher than if iron chloride crystals are used. In any case the water vapor is removed by condensation which will carry with it some hydrochloric acid but this condensate containing hydrochloric acid can be led into the water in which the remaining acid gas is absorbed. I have discovered that my process works best when the vapors leaving the kiln contain about 20% water.

The dry iron oxide formed by the reaction leaves the rotatory kiln with the balls, some of it clinging to said balls. Before the balls can be returned to the furnace for recycling, they must be separated from the iron oxide. This is done by passing them and the iron oxide over a screen or grate as they leave the kiln. The jarring effect obtained by dropping the balls on the screen or grate as they leave the kiln combined with a bouncing effect as they pass over the screen or grate will cause separation, the iron oxide passing through the screen or grate and the balls passing on to the furnace.

By regulating the excess amounts of water along with the air or oxygen and by preventing dilution and pollution by products of combustion and the vaporization of iron chloride, the process can be made to yield gases leaving the kiln having a composition of about 40–50% hydrochloric acid gas, about 20% water and 20–30% oxygen and nitrogen. After condensing out the water as strong hydrochloric acid a 50–66% hydrochloric acid gas is obtained from this mixture.

The iron chloride resulting from some processes will be present, principally or entirely, in the form of ferrous chloride. Such is the case for instance when waste hydrochloric acid liquors obtained from leaching operations are converted to iron chloride by reaction with scrap iron. Oxygen or air is required for the reaction where ferrous chloride is used to produce hydrochloric acid gas and iron oxide. When ferric chloride only is present no air or oxygen is required for the reaction and this allows the formation of even higher concentrations of the hydrochloric acid gas by my process.

In the accompanying drawing apparatus is shown in which my process may be carried out. Fig. 1 is an elevation partly in section of subject apparatus and Fig. 2 is a horizontal view of the apparatus shown in Fig. 1.

In the drawing, 1 is a ball furnace such as described in my copending application, Serial No. 646,301, filed February 8, 1946. Balls 2 are heated in furnace 1 and delivered through pipe 24 to the rotatory kiln 3 in which the reaction takes place. After contributing a part of their sensible heat the balls 2 leave kiln 3 and pass over a screen 4 and are returned to the furnace by conveyors 5 and 6 for reheating and recycling, re-entering the furnace at point 7.

Air or oxygen, or air or oxygen with steam enter the rotatory kiln 3 in regulated quantities through inlet 10. Iron chloride either as concentrated solution or hydrated crystals enters kiln 3 through pipe 8. Gaseous products of the reaction are removed through outlet 9. The dry oxide formed by the reaction leaves kiln 3 along with balls 2 below inlet 10 and falls on screen 4 which may be an iron grate. The iron oxide passes through the grate and into 25 which is shown as a removable box but which may be a conveyor. The balls 2 pass over the grate or screen and back to the furnace for recycling. Of course, it is possible to withdraw the gaseous products through pipes 9 and 10 and to lead the air or oxygen and steam into the kiln with the iron chloride through pipe 8.

The gases leaving the rotatory kiln at outlet 9 may be passed to a dust removing chamber, then on to a cooling system where water vapor is condensed and then to an absorption system for absorbing the acid gases. A fan may be used to draw the gases from the kiln through the dust chamber, cooler and absorption system. If solutions of iron chloride are used it may be desirable to further dehydrate them and this may be done by using the waste heat in the gases issuing from furnace 1 and/or by the gases leaving the kiln 3.

The balls 2 enter furnace 1 at inlet 7 and pass down through the furnace on fluted, grooved, inclined grates 11. They are heated by the hot gases resulting from the combustion of fuel in burners 12 which are disposed below each burner so that the products of combustion pass up through the grates and in contact with the balls to be heated. The balls are discharged from the furnace and delivered to the kiln through pipe 24 by a discharge mechanism consisting of a rotatable cylinder 13 and a substantially gas-tight housing 14. The rotatable discharge cylinder 13 may discharge the balls at any desired rate depending upon the heat requirements of the kiln by varying its rate of revolution by means of motor 15. The temperature of the balls may be controlled by the rate of combustion of the fuel. Thus the amount of heat delivered to the kiln 3 is controlled by the rate of flow of the balls to the kiln and the temperature of the balls is controlled by the conditions in the furnace.

The rotatory kiln 3 into which the balls 2 are delivered may be constructed of any suitable heat and acid resistant material 16 which is surrounded by a steel plated sheath 17. The kiln 3 revolves on tires 18 supported on rotor wheels 19 mounted on shaft 20 which is mounted on journals 23 and revolved by a motor (not shown) which drives drive wheel 21. As shown in the drawing in Fig. 1 the rotatory kiln is inclined toward the ball discharge point to assist passage and discharge of the solid materials from the kiln.

In order to provide the substantially gas-tight apparatus which is necessary to get a high concentration of hydrochloric acid gas in the process, leakage of outside air into the kiln is substantially eliminated by gas-tight seals 22 which may be a graphited woven asbestos seal.

The balls 2 which may be heated in furnace 1 at any desired temperature and at any temperature gradient between the surface and center may be delivered to kiln 3 at any desired rate. It is preferable that the ball furnace temperature be about 3000° F. and that the balls 2 be about 1" in diameter and made from chrome nickel alloy steel and that the surface temperature of the balls be about 1800° F. with the temperature difference between the center and the surface about 55° and that the temperature of the reaction in the kiln be between 600 and 1200° F. These preferred temperatures can be controlled by a proper location of thermostats at various points in the apparatus such as for example in the upper, central, and lower areas of the furnace and at the inlet 10 and outlet 9 in kiln 3. The balls therefore deliver the proper quantities of heat at the proper temperature to the kiln 3 and by their rotation in kiln 3, they supply the necessary agitation and grinding which are essential for a rapid, efficient reaction and for carrying the reaction to completion.

It will be noted that my process provides a use for iron chloride by converting it into iron oxide and hydrochloric acid, both of which and especially hydrochloric acid, are used in large quantities in industry. This is effected by a rapid reaction of iron chloride with water and air or oxygen to give iron oxide, water and a high concentration of hydrochloric acid gas which in turn is dissolved in water to give relatively high concentrations of hydrochloric acid solution. A rapid reaction is carried to completion by means of heated balls rolling in a rotating reaction chamber or kiln thereby supplying the necessary heat for the reaction by part of the sensible heat in the balls and the necessary agitation and grinding by their rolling action.

I claim:

1. A method of producing hydrochloric acid gas and iron oxide from iron chloride which comprises heating, agitating and grinding in a rotatory kiln a stream of said iron chloride in the presence of air and water to temperatures of 600 to 1200° F. by the action of a stream of heated balls and thereby decomposing said iron chloride into iron oxide with the evolution of hydrochloric acid gas and water vapor, continuously removing said acid gas and water vapor, continuously removing the iron oxide and the balls, separating said iron oxide from said balls and reheating and recycling said balls.

2. A method of producing hydrochloric acid and iron oxide which comprises introducing iron chloride, air and water into a rotating kiln, introducing into said kiln a stream of balls preheated to a temperature above the reaction temperature, subjecting the reactants to the heating and mechanical grinding action of said balls during continued rotation of said kiln, maintaining a reaction at temperatures of 600 to 1200° F. in said kiln, converting said iron chloride to iron oxide and gases containing about 40 to 50 percent hydrochloric acid, about 20 percent water and 20 to 30 percent oxygen plus nitrogen, continuously removing said gases, then condensing the water vapor from said gases, and absorbing the hydrochloric acid gas in water, continuously removing the iron oxide and the balls, separating said iron oxide from said balls and recycling and reheating said balls.

SAMUEL STRELZOFF.

REFERENCES CITED

The following references are of record in the file of this patent:

UNITED STATES PATENTS

| Number | Name | Date |
|---|---|---|
| 1,320,640 | McAdam | Nov. 4, 1919 |
| 1,435,930 | Laury | Nov. 21, 1922 |

FOREIGN PATENTS

| Number | Country | Date |
|---|---|---|
| 16,166 | Great Britain (1888) | Aug. 24, 1889 |
| 58,960 | Sweden | June 5, 1923 |